United States Patent
Nada

(10) Patent No.: US 7,295,918 B2
(45) Date of Patent: Nov. 13, 2007

(54) AUTOMOBILE AND CONTROL METHOD OF AUTOMOBILE

(75) Inventor: Mitsuhiro Nada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/025,965

(22) Filed: Jan. 3, 2005

(65) Prior Publication Data

US 2005/0187671 A1 Aug. 25, 2005

Related U.S. Application Data

(63) Continuation of application No. PCT/JP03/06688, filed on May 28, 2003, now abandoned.

(30) Foreign Application Priority Data

Jul. 3, 2002 (JP) .............................. 2002-194632

(51) Int. Cl.
*F02D 35/00* (2006.01)
*G06F 19/00* (2006.01)
*G08G 1/00* (2006.01)

(52) U.S. Cl. .................. 701/116; 701/70; 701/99; 290/40 A; 290/47

(58) Field of Classification Search ............... 701/65, 701/70, 116, 99; 477/42, 901; 290/40 A, 290/47, 40 C; 475/5
See application file for complete search history.

(56) References Cited

U.S. PATENT DOCUMENTS 5,376,869 A 12/1994 Konrad

| | | | |
|---|---|---|---|
| 5,568,024 A | 10/1996 | Suzuki | |
| 6,033,041 A * | 3/2000 | Koga et al. | 303/152 |
| 6,278,916 B1 * | 8/2001 | Crombez | 701/22 |
| 6,457,454 B1 * | 10/2002 | Gras | 123/406.23 |
| 6,502,027 B2 * | 12/2002 | Saotome et al. | 701/67 |

(Continued)

FOREIGN PATENT DOCUMENTS

CN 1178746 A 4/1998

(Continued)

OTHER PUBLICATIONS

English Language Version of Supplementary European Search Report, Appln. No. EP 03 73 3136, dated Mar. 8, 2006.

*Primary Examiner*—Thomas Black
*Assistant Examiner*—Christine M Behncke
(74) *Attorney, Agent, or Firm*—Kenyon & Kenyon LLP

(57) ABSTRACT

When an automobile moves in a reverse direction opposite to an expected driving direction according to the current setting of a gearshift position SP, the automobile of the invention sets an adjustment torque Ta corresponding to a measured road surface gradient $\theta$ as a required torque to converge the vehicle speed of the automobile with only a driver riding thereon in the reverse direction (that is, in a slide-down direction) to a preset level of vehicle speed (step S200). The automobile then compares the setting of the adjustment torque Ta with a creep torque Tc, which is set in a vehicle driving state within an allowable creep torque output range (step S150), and outputs the greater torque as a motor torque Tm from a motor (steps S210 and S220). This arrangement effectively regulates the vehicle speed of the automobile moving in the reverse direction opposite to the expected driving direction to the preset level of vehicle speed.

11 Claims, 3 Drawing Sheets

U.S. PATENT DOCUMENTS

| | | | |
|---|---|---|---|
| 6,569,052 B2 * | 5/2003 | Sakai et al. | 475/214 |
| 6,590,299 B2 * | 7/2003 | Kuang et al. | 290/40 C |
| 7,032,697 B2 * | 4/2006 | Lee | 180/65.2 |
| 2001/0001842 A1 * | 5/2001 | Sugitani et al. | 701/1 |
| 2002/0065170 A1 * | 5/2002 | Suzuki | 477/171 |

FOREIGN PATENT DOCUMENTS

| | | |
|---|---|---|
| DE | 24 11 550 | 3/1974 |
| EP | 0 754 588 A1 | 1/1997 |
| JP | 64-25435 | 2/1989 |
| JP | 04-164590 | 1/1994 |
| JP | 05-184737 | 6/1994 |
| JP | 05-176439 | 1/1995 |
| JP | 05-230414 | 3/1995 |
| JP | 06-107071 | 12/1995 |
| JP | 08-228942 | 3/1998 |
| JP | 1998-274112 | 4/1998 |
| JP | 09-097177 | 10/1998 |
| JP | 10-095716 | 10/1999 |
| JP | 11-025822 | 8/2000 |
| JP | 2000-308305 | 6/2001 |
| JP | 2001-171377 | 6/2001 |
| JP | 2000-034150 | 7/2001 |
| JP | 2000-057194 | 9/2001 |
| JP | 2001-239853 | 9/2001 |
| JP | 2000-237808 | 2/2002 |
| JP | 2001-243147 | 2/2003 |
| WO | WO93/04888 | 3/1993 |

* cited by examiner

# AUTOMOBILE AND CONTROL METHOD OF AUTOMOBILE

CROSS-REFERENCE TO RELATED APPLICATION

This is a continuation of Application PCT/JP03/06688, filed May 28, 2003, now abandoned.

BACKGROUND OF THE INVENTION

1. Field of the Invention

The present invention relates to an automobile and a control method of the automobile. More specifically the invention pertains to an automobile that is driven with power supplied from a power output device, as well as to a control method of such an automobile.

2. Description of the Prior Art

One proposed automobile actuates and controls a motor attached to drive wheels to apply a creep torque corresponding to a step-on amount of a brake pedal (see, for example, Japanese Patent Laid-Open Gazette No. 10-75505). This automobile sets the creep torque corresponding to the step-on amount of the brake pedal to prevent an unintentional slide-down on a sloping road, while attaining a creep torque-based drive on a flat road to enhance the energy efficiency.

The automobile applies only a preset level of creep torque, when the driver fully releases the brake pedal. While the automobile is at a stop on an upslope, the road surface gradient of the upslope may cause the automobile to slide down with no regulation of the slide-down speed.

SUMMARY OF THE INVENTION

The object of the invention is thus to regulate a vehicle speed of an automobile moving in a reverse direction opposite to a preset driving direction. The object of the invention is also to ensure the driver's substantially constant drive feeling regardless of a variation in road surface gradient.

In order to achieve at least a part of the aforementioned objects, the automobile of the present invention is structured as follows.

An automobile of the present invention is driven with power supplied from a power output device, and includes: a driving direction setting module that presets a driving direction of the automobile; a reverse direction travel detection module that detects a travel of the automobile in a reverse direction opposite to the preset driving direction; and a driving control module that sets an adjustment torque to be applied in the preset driving direction and actuates and controls the power output device to apply the adjustment torque, only in response to setting of the driving direction by the driving direction setting module and detection of the travel of the automobile in the reverse direction opposite to the preset driving direction in an accelerator off state by the reverse direction travel detection module.

The automobile of the invention sets the adjustment torque to be applied in the preset driving direction and actuates and controls the power output device to apply the adjustment torque, in response to detection of the travel of the automobile in the reverse direction opposite to the preset driving direction in an accelerator off state. This arrangement effectively regulates the vehicle speed of the automobile moving in the reverse direction, that is, in a slide-down direction.

In the automobile of the invention, there may be further provided with a road surface gradient measurement estimation module that measures or estimates a road surface gradient and the driving control module may set the adjustment torque based on the measured or estimated road surface gradient. This arrangement sets the adjustment torque based on the road surface gradient and thereby ensures the driver's substantially constant drive feeing regardless of a variation in road surface gradient.

In one preferable embodiment of the automobile of the invention that sets the adjustment torque based on the road surface gradient, the driving control module sets the adjustment torque according to a map that represents a variation in adjustment torque against road surface gradient to converge a vehicle speed of the automobile with only a driver riding thereon in the reverse direction to a preset level of vehicle speed.

In the automobile of the invention that sets the adjustment torque based on the road surface gradient, there may be further provided with an initial torque setting module that sets an initial torque applied in the preset driving direction, based on the measured or estimated road surface gradient, and the driving control module actuates and controls the power output device to apply the initial torque in a brake off state while the automobile is at a stop. This arrangement effectively prevents an abrupt slide-down of the automobile.

In the automobile of the invention, the reverse direction travel detection module may measure a vehicle speed in the reverse direction, and the driving control module may set the adjustment torque to converge the measured vehicle speed in the reverse direction to a preset level of vehicle speed. This arrangement regulates the vehicle speed in the reverse direction to the preset level of vehicle speed. The preset level of vehicle speed may be equal to, for example, a walking speed.

In the automobile of the invention, there may be further provided with a creep torque setting module that sets a creep torque applied in the preset driving direction when a predetermined condition is fulfilled, and the driving control module may actuate and control the power output device to apply a greater torque between the adjustment torque and the creep torque. This arrangement well balances the conventional vehicle control based on the creep torque with the vehicle control based on the adjustment torque.

In the automobile of the invention equipped with the creep torque setting module, the creep torque setting module may set a value '0' to the creep torque in response to a braking operation of lowering a vehicle speed of the automobile to zero, and set a predetermined level of the creep torque in response to detection of a brake off state. This arrangement desirably restrains output of a non-required creep torque, thus desirably enhancing the energy efficiency.

In the automobile of the invention, the driving control module may release the adjustment torque in response to an accelerator off operation after an accelerator on operation. This arrangement effectively prevents a potential torque shock due to release of the adjustment torque.

In the automobile of the invention, the power output device may include a motor that inputs and outputs powers from and to an axle. This arrangement regulates the output torque from the motor to apply the adjustment torque.

In the automobile of the invention, the power output device may include an internal combustion engine, a drive shaft motor that inputs and outputs powers from and to a drive shaft linked to an axle, and a power transmission module that transmits power from an output shaft of the internal combustion engine to the drive shaft through input and output of electrical energy-based powers, and the driving control module may control the internal combustion engine, the drive shaft motor, and the power transmission module to apply a power corresponding to a preset deceleration to the drive shaft.

In one preferable embodiment of the automobile of the invention equipped with the power output device including the internal combustion engine, the drive shaft motor, and the power transmission module, the power transmission module has: a three shaft-type power input output module that is linked to the output shaft of the internal combustion engine, the drive shaft, and a rotating shaft and inputs and outputs powers from and to one residual shaft according to powers input and output from and to any two shafts among the three shafts; and a rotating shaft motor that inputs and outputs powers from and to the rotating shaft.

In another preferable embodiment of the automobile of the invention equipped with the power output device including the internal combustion engine, the drive shaft motor, and the power transmission module, the power transmission module may include a pair rotor motor that has a first rotor connected to the output shaft of the internal combustion engine and a second rotor connected to the drive shaft to be rotatable relative to the first rotor, where the pair rotor motor enables the input and output of the electrical energy-based powers based on an electromagnetic operation of the first rotor relative to the second rotor.

The automobile control method of the invention controls an automobile that is driven in a preset driving direction with power supplied from a power output device, and includes the steps of: (a) detecting a travel of the automobile in a reverse direction opposite to the preset driving direction; and (b) setting an adjustment torque to be applied in the preset driving direction and actuating and controlling the power output device to apply the adjustment torque, only in response to detection of the travel of the automobile in the reverse direction opposite to the preset driving direction in an accelerator off state.

The automobile control method of the invention sets the adjustment torque to be applied in the preset driving direction and actuates and controls the power output device to apply the adjustment torque, in response to detection of the travel of the automobile in the reverse direction opposite to the preset driving direction in an accelerator off state. This arrangement effectively regulates the vehicle speed of the automobile moving in the reverse direction, that is, in a slide-down direction.

In the automobile control method of the invention, the step (b) may detect a road surface gradient and sets the adjustment torque based on the detected road surface gradient. This arrangement sets the adjustment torque based on the road surface gradient and thereby ensures the driver's substantially constant drive feeing regardless of a variation in road surface gradient.

The automobile control method of the invention may further include the step of setting a creep torque applied in the preset driving direction when a predetermined condition is fulfilled, prior to the step (b), and the step (b) may actuate and control the power output device to apply a greater torque between the adjustment torque and the creep torque. This arrangement well balances the conventional vehicle control based on the creep torque with the vehicle control based on the adjustment torque.

DESCRIPTION OF THE PREFERRED EMBODIMENTS

Figure 1:
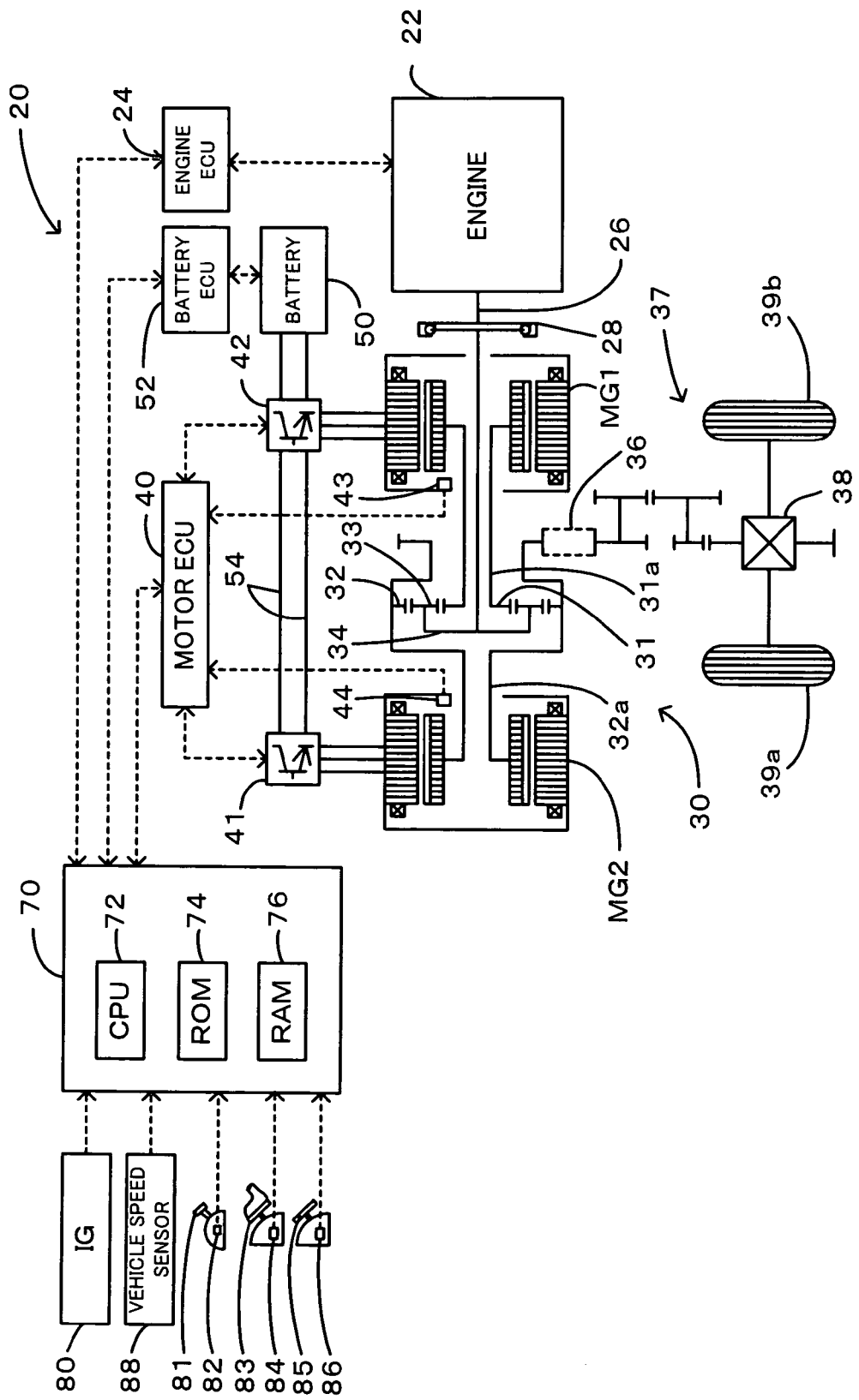
FIG. 1 schematically illustrates the structure of a hybrid vehicle 20 in one embodiment of the present invention.

One mode of carrying out the present invention is discussed below as a preferred embodiment. FIG. 1 schematically illustrates the structure of a hybrid vehicle 20 with a power output apparatus mounted thereon in one embodiment of the present invention. The hybrid vehicle 20 of the embodiment includes an engine 22, a triaxial power distribution integration mechanism 30 that is connected to a crankshaft 26 or an output shaft of the engine 22 via a damper 28, a motor MG1 that is connected to the power distribution integration mechanism 30 to generate electric power, another motor MG2 that is connected to the power distribution integration mechanism 30, and a hybrid electronic control unit 70 that controls the whole driving system of driving wheels.

The engine 22 is an internal combustion engine that outputs power using a hydrocarbon fuel, such as gasoline or diesel oil. An engine electronic control unit (hereinafter referred to as engine ECU) 24 receives signals from diverse sensors that detect the driving conditions of the engine 22, and controls the operations of the engine 22 including the control of fuel injection, the control of ignition, and the regulation of the intake air flow. The engine ECU 24 communicates with the hybrid electronic control unit 70 and controls the operations of the engine 22 in response to control signals from the hybrid electronic control unit 70 while outputting data regarding the driving conditions of the engine 22 to the hybrid electronic control unit 70 according to the requirements.

The power distribution integration mechanism 30 includes a sun gear 31 as an external gear, a ring gear 32 as an internal gear arranged concentrically with the sun gear 31, multiple pinion gears 33 engaging with both the sun gear 31 and the ring gear 32, and a carrier 34 holding the multiple pinion gears 33 in such a manner that allows both revolution and rotation on its axis. Namely the power distribution integration mechanism 30 is constructed as a planetary gear mechanism that attains differential actions with the sun gear 31, the ring gear 32, and the carrier 34 as rotational elements. In the power distribution integration mechanism 30, the crankshaft 26 of the engine 22, the motor MG1, and the motor MG2 are respectively linked with the carrier 34, the sun gear 31, and the ring gear 32. When the motor MG1 works as an electric generator, the power of the engine 22 input via the carrier 34 is distributed into the sun gear 31 and the ring gear 32 according to their gear ratio. When the motor MG1 works as an electric motor, on the other hand, the power of the engine 22 input via the carrier 34 and the power of the motor MG1 input via the sun gear 31 are integrated and output to the ring gear 32. The ring gear 32 is mechanically linked with front driving wheels 39a and 39b of the vehicle via a belt 36, a gear mechanism 37, and a differential gear 38. The power output to the ring gear 32 is accordingly transmitted to the driving wheels 39a and 39b via the belt 36, the gear mechanism 37, and the differential gear 38. In the driving system, the three shafts connected to the power distribution and integration mechanism 30 include the output shaft of the engine 22 or the crankshaft 26 that is coupled with the carrier 34, a rotating shaft of the motor MG1 or a sun gear shaft 31a that is coupled with the sun gear 31, and a drive shaft or a ring gear shaft 32a that is coupled with the ring gear 32 and is mechanically linked with the driving wheels 39a and 39b.

Both of the motors MG1 and MG2 are constructed as known synchronous generator motors, which are driven as an electric generator as well as an electric motor. The motors MG1 and MG2 transmit electric power from and to a battery 50 via inverters 41 and 42. A power line 54 connecting the inverters 41 and 42 with the battery 50 includes a positive terminal bus line and a negative terminal bus line shared by the two inverters 41 and 42. This arrangement enables the electric power generated by one of the motors MG1 and MG2 to be consumed by the other motor. The battery 50 is charged with the excess electric power of the motor MG1 or the motor MG2 and is discharged to supplement the insufficient electric power of the motor MG1 or the motor MG2. The battery 50 is neither charged not discharged when there is an electric power balance by the motors MG1 and MG2. The motors MG1 and MG2 are both driven and controlled by a motor electronic control unit (hereinafter referred to as motor ECU) 40. The motor ECU 40 receives signals required for driving and controlling the motors MG1 and MG2, for example, signals from rotational position detection sensors 43 and 44 that detect the rotational positions of rotors in the motors MG1 and MG2 and values of phase electric currents supplied to the motors MG1 and MG2 and detected by non-illustrated electric current sensors. The motor ECU 40 outputs switching control signals to the inverters 41 and 42. The motor ECU 40 calculates revolving speeds Nm1 and Nm2 of the rotors in the motors MG1 and MG2 from the signals input from the rotational position detection sensors 43 and 44 according to a revolving speed calculation routine (not shown). Since the motor MG1 is linked with the sun gear 31 and the motor MG2 is linked with the ring gear 32, the revolving speeds Nm1 and Nm2 correspond to the revolving speeds of the sun gear shaft 31a and the ring gear shaft 32a. The motor ECU 40 communicates with the hybrid electronic control unit 70 and drives and controls the motors MG1 and MG2 in response to control signals from the hybrid electronic control unit 70 while outputting data regarding the driving conditions of the motors MG1 and MG2 to the hybrid electronic control unit 70 according to the requirements.

The battery 50 is controlled by a battery electronic control unit (hereinafter referred to as battery ECU) 52. The battery ECU 52 receives signals required for controlling the battery 50, for example, a value of inter-terminal voltage measured by a non-illustrated voltage sensor disposed between terminals of the battery 50, a value of charge discharge electric current measured by a non-illustrated electric current sensor attached to the power line 54 connecting with an output terminal of the battery 50, and a battery temperature measured by a non-illustrated temperature sensor attached to the battery 50. The battery ECU 52 outputs data regarding the conditions of the battery 50 to the hybrid electronic control unit 70 via communication according to the requirements. The battery ECU 52 computes a state of charge (SOC) from an accumulated value of the charge discharge electric current measured by the electric current sensor for controlling the battery 50.

The hybrid electronic control unit 70 is constructed as a microprocessor including a CPU 72, a ROM 74 that stores processing programs, a RAM 76 that temporarily stores data, and non-illustrated input and output ports and communication port. The hybrid electronic control unit 70 receives, via the input port, an ignition signal from an ignition switch 80, a gearshift position SP from a gearshift position sensor 82 that detects the current position of a gearshift lever 81 set by the driver's gearshift operation, an accelerator opening Adrv from an accelerator pedal position sensor 84 that detects the accelerator opening Adrv corresponding to the driver's step-on amount of an accelerator pedal 83, a brake pedal position BP from a brake pedal position sensor 86 that detects the driver's step-on amount of a brake pedal 85, a vehicle speed V from a vehicle speed sensor 88, and a road surface gradient $\theta$ from a slope sensor (not shown). The hybrid electronic control unit 70 is connected with the engine ECU 24, the motor ECU 40, and the battery ECU 52 via the communication port as mentioned previously to receive and send various control signals and data from and to the engine ECU 24, the motor ECU 40, and the battery ECU 52.

The hybrid vehicle 20 of the embodiment constructed as discussed above calculates a torque demand to be output to the ring gear shaft 32a or the drive shaft from the vehicle speed V and the accelerator opening Adrv corresponding to the driver's step-on amount of the accelerator pedal 83, and controls the operations of the engine 22 and the motors MG1 and MG2 to attain output of a power demand corresponding to the torque demand to the ring gear shaft 32a. There are multiple drive modes of controlling the engine 22 and the motors MG1 and MG2. In a torque conversion drive mode, the engine 22 is driven and controlled to output a power corresponding to the power demand. The motors MG1 and MG2 are driven and controlled to make all the output power of the engine 22 subjected to torque conversion by the combination of the power distribution integration mechanism 30 and the motors MG1 and MG2 and to output the torque-converted power to the ring gear shaft 32a. In a charge discharge drive mode, the engine 22 is driven and controlled to output a power corresponding to the sum of the power demand and an electric power required to charge the battery 50 or discharged from the battery 50. The motors MG1 and MG2 are driven and controlled to make all or part of the output power of the engine 22 with charge or discharge of the battery 50 subjected to torque conversion by the combination of the power distribution integration mechanism 30 and the motors MG1 and MG2 and to output a power corresponding to the power demand to the ring gear shaft 32a. In a motor drive mode, the engine 22 stops operations, while the motor MG2 is driven and controlled to output a power corresponding to the power demand to the ring gear shaft 32a.

Figure 2:
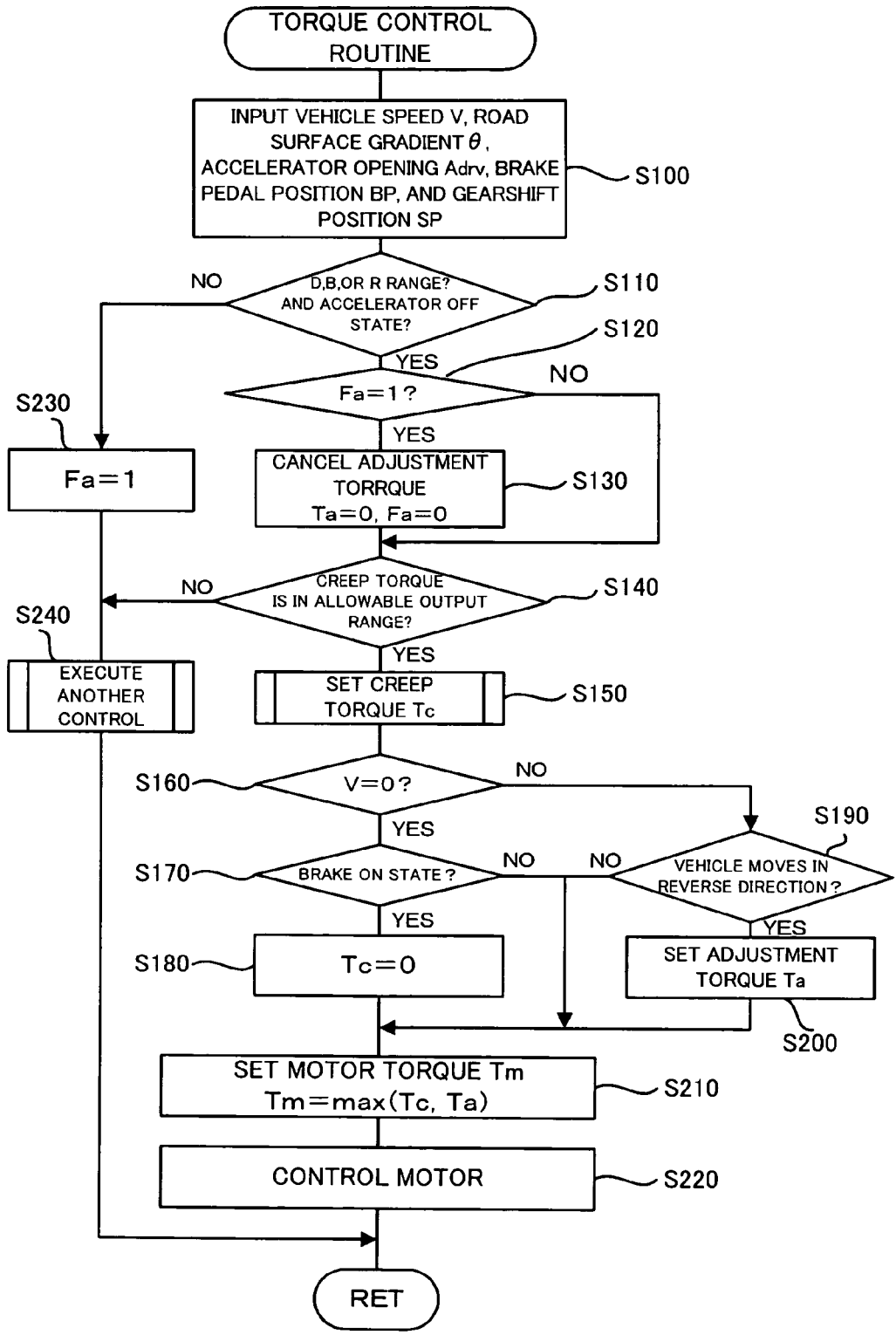
FIG. 2 is a flowchart showing a torque control routine executed by a hybrid electronic control unit 70.

The following describes operations of the hybrid vehicle 20 of the embodiment, especially a series of operations when the hybrid vehicle 20 is at a stop or in a state immediately before a stop or immediately before a re-start (that is, in a state of stepping on the brake pedal 85 to stop the vehicle or in a state immediately before a depression of the accelerator pedal 83 to re-start the vehicle). FIG. 2 is a flowchart showing a torque control routine executed by the hybrid electronic control unit 70. This torque control routine is repeatedly executed at preset time intervals (for example, at every 8 msec).

When the program enters the torque control routine, the CPU 72 of the hybrid electronic control unit 70 first reads the required data for control, for example, the gearshift position SP detected by the gearshift position sensor 81, the accelerator opening Adrv detected by the accelerator pedal position sensor 83, the brake pedal position BP detected by the brake pedal position sensor 85, the vehicle speed V measured by the vehicle speed sensor 88, and the road surface gradient θ measured by the slope sensor 90 (step S100). The CPU 72 then determines whether the current setting of the gearshift position SP is at a drivable position, that is, in any of ranges D, B, and R and whether the current setting of the accelerator opening Adrv represents an accelerator OFF state (step S110). When it is determined that the current setting of the gearshift position SP is not at any drivable position, the driver does not intend to drive currently. When it is determined that the current setting of the accelerator opening Adrv represents an accelerator ON state, the driver steps on the accelerator pedal 83 to output the torque corresponding to the accelerator opening Adrv. In either case, the hybrid vehicle 20 is not in the target state of this torque control, that is, neither at a stop nor in a state immediately before a stop or immediately before a re-start. The CPU 72 accordingly sets a value '1' to an adjustment torque release flag Fa (step S230) and executes another control, for example, torque control according to the accelerator opening Adrv (step S240), before exiting from this torque control routine.

When it is determined that the current setting of the gearshift position SP is at any drivable position and that the current setting of the accelerator opening Adrv represents an accelerator OFF state, on the other hand, the CPU 72 determines whether the adjustment torque release flag Fa is set equal to 1 (step S120). When the adjustment torque release flag Fa is equal to 1, the CPU 72 sets a value '0' to both an adjustment torque Ta and the adjustment torque release flag Fa (step S130). The adjustment torque Ta will be discussed later.

The CPU 72 subsequently determines whether the current driving state of the vehicle is in an allowable creep torque output range (step S140). The allowable creep torque output range is set as a required creep torque output area and is specified according to the driving conditions including the vehicle speed V, the brake pedal position BP, and the brake oil pressure, the performances of the motor MG2, and the driving characteristics of the vehicle. When the current driving state of the vehicle is out of the allowable creep torque output range, the CPU 72 determines no necessity of output of the creep torque and executes another control (step S240), before exiting from this torque control routine.

When the current driving state of the vehicle is in the allowable creep torque output range, on the other hand, the CPU 72 sets a creep torque Tc (step S150). The creep torque Tc may be set by any suitable technique. One applicable technique multiplies a specified level of torque by a correction coefficient depending upon the vehicle speed V or the brake oil pressure to set the creep torque Tc. Another applicable technique may directly set a specified level of torque to the creep torque Tc.

Figure 3:
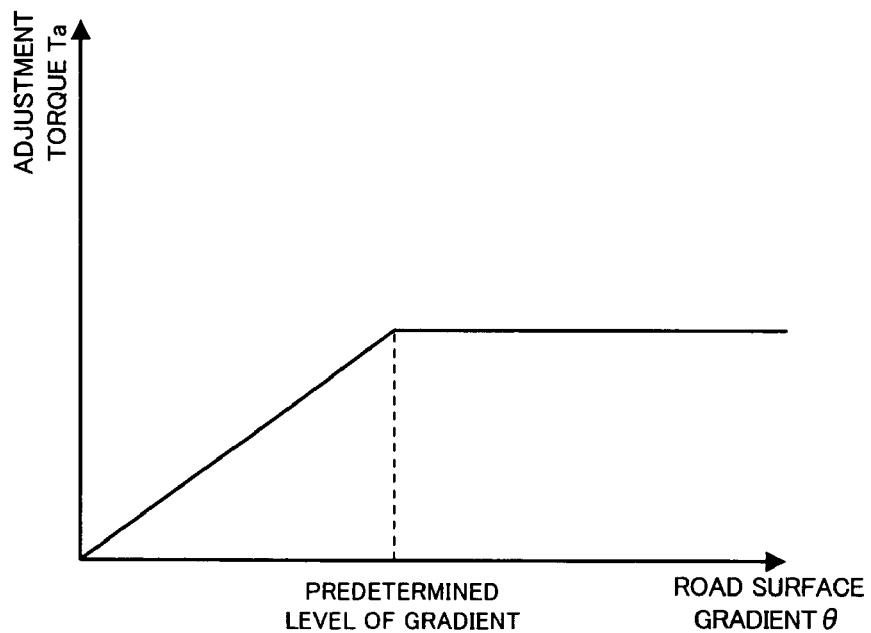
FIG. 3 shows an example of an adjustment torque setting map.

The CPU 72 determines whether the vehicle is at a stop, on the basis of the input vehicle speed V (step S160). When the vehicle is at a stop, the CPU 72 subsequently determines whether the vehicle is in the brake ON state, on the basis of the input brake pedal position BP (step S170). In the brake ON state, the CPU 72 determines no necessity of the creep torque and sets a value '0' to the creep torque Tc (step S180). When it is determined at step S160 that the vehicle is not at a stop, the CPU 72 determines whether the vehicle moves in a reverse direction, that is, whether a slide-down of the vehicle is detected, on the basis of the gearshift position SP (step S190). When the vehicle moves in the reverse direction, the adjustment torque Ta is set according to the input road surface gradient θ (step S200). The adjustment torque Ta, as well as the creep torque Tc is applied in an expected driving direction, that is, in a forward direction in the setting of the gearshift position SP in the D range and in a backward direction in the setting of the gearshift position SP in the R range. In this embodiment, a variation in adjustment torque Ta against the road surface gradient θ is specified in advance and is stored as an adjustment torque setting map in the ROM 74. The adjustment torque Ta corresponding to the given road surface gradient θ is read from the adjustment torque setting map. The adjustment torque setting map used in this embodiment sets the adjustment torque Ta equal to a required torque for converging the vehicle speed of the vehicle with only a driver riding thereon in the reverse direction (in the slide-down direction) to a preset level of vehicle speed (for example, a walking speed of 1 to 5 km/h) against the road surface gradient θ of or below a predetermined level. The adjustment torque setting map sets a torque corresponding to the road surface gradient θ of the predetermined level to the adjustment torque Ta against the road surface gradient θ exceeding the predetermined level. FIG. 3 shows an example of the adjustment torque setting map. The torque control routine does not set the creep torque Tc equal to zero in the brake OFF state, even when the vehicle is at a stop. The torque control routine does not execute setting of the adjustment torque Ta, when the vehicle is not at a stop nor moves in the reverse direction.

After setting the creep torque Tc and the adjustment torque Ta, the greater torque between the creep torque Tc and the adjustment torque Ta is set to a motor torque Tm to be output from the motor MG2 (step S210). The motor MG2 is then controlled to output the setting of the motor torque Tm (step S220). The torque control routine is here terminated.

In one example, it is assumed that the driver sets the gearshift lever 81 in the D range and releases the brake pedal 85, while the vehicle is at a stop on an upslope. The adjustment torque Ta is cancelled and is reset to zero at step S130. The vehicle still stops with the vehicle speed V equal to 0 and is in the brake OFF state immediately after the driver releases the brake pedal 85. The creep torque Tc is accordingly set at step S150 and is output as the motor torque Tm from the motor MG2. Under the condition of a large road surface gradient θ, a reverse travel of the vehicle (in a backward direction in the D range), that is, a slide-down of the vehicle, is detected after the driver releases the brake pedal 85. In this case, the adjustment torque Ta is set corresponding to the road surface gradient θ at step S200. The adjustment torque Ta is output as the motor torque Tm from the motor MG2, when the adjustment torque Ta is greater than the creep torque Tc. As described above, the adjustment torque Ta is set as the required torque for converging the vehicle speed of the vehicle with only a driver riding thereon in the reverse direction (in the slide-down direction) to the preset level of vehicle speed. Under the condition of the road surface gradient θ of or below the predetermined level, the vehicle speed in the reverse direction is converged to the preset level of vehicle speed regardless of a variation in road surface gradient θ. The procedure of the embodiment refers to the adjustment torque setting map specified for the vehicle with only a driver riding thereon to set the adjustment torque Ta even when the vehicle has one or two passengers in addition to the driver. The vehicle speed is accordingly converged to a slightly greater level than the preset level of vehicle speed when the vehicle has one or two passengers in addition to the driver.

When the driver steps on the accelerator pedal 83, another torque control, which is different from the flow of the torque control discussed above, is executed based on the accelerator opening Adrv corresponding to the driver's step-on amount of the accelerator pedal 83 to make the behavior of the vehicle depend upon the driver's step-on action of the accelerator pedal 83.

As described above, in the hybrid vehicle 20 of the embodiment, the vehicle speed in the reverse direction opposite to the expected driving direction is effectively converged to the preset level of vehicle speed, when the driver manipulates the shift lever 81 and releases the brake pedal 85 to re-start the vehicle. The adjustment torque Ta used for the convergence is set corresponding to the road surface gradient θ. This arrangement ensures the driver's substantially constant drive feeling regardless of a variation in road surface gradient.

In the hybrid vehicle 20 of the embodiment, when the vehicle stops with the vehicle speed V equal to 0 and is in the brake OFF state, the creep torque Tc set at step S150 is output as the motor torque Tm from the motor MG2. One modified procedure may set either the creep torque Tc or the adjustment torque Ta as an initial torque corresponding to the road surface gradient θ and may output the initial torque as the motor torque Tm from the motor MG2, when the vehicle stops with the vehicle speed V equal to 0 and is in the brake OFF state. This arrangement effectively restrains an abrupt slide-down of the vehicle.

In the hybrid vehicle 20 of the embodiment, the torque control routine specifies the creep torque Tc and the adjustment torque Ta and sets the greater torque between the creep torque Tc and the adjustment torque Ta to the motor torque Tm to be output from the motor MG2. One modified procedure may set the sum of the creep torque Tc and the adjustment torque Tm to the motor torque Tm to be output from the motor MG2. Another modified procedure may not specify the creep torque Tc but set the adjustment torque Ta to the motor torque Tm to be output from the motor MG2. In the latter modification with no setting of the creep torque Tc, no torque is output from the motor MG2 in the brake OFF state when the vehicle is at a stop on the flat road.

The hybrid vehicle 20 of the embodiment sets the adjustment torque Ta corresponding to the road surface gradient θ measured by the slope sensor 90. One modified procedure may estimate the road surface gradient θ from the relation between the acceleration of the vehicle and the output torque from the engine 22, the power distribution integration mechanism 30, and the motors MG1 and MG2 as the power output device during a drive or in the state to a stop of the vehicle, and set the adjustment torque Ta corresponding to the estimated road surface gradient θ.

The hybrid vehicle 20 of the embodiment uses the adjustment torque setting map to set the adjustment torque Ta. The adjustment torque setting map represents the variation in adjustment torque Ta against the road surface gradient θ as the required torque for converging the vehicle speed of the vehicle with only a driver riding thereon in the reverse direction (in the slide-down direction) to the preset level of vehicle speed. The adjustment torque Ta may be set according to any other map representing the relation between the adjustment torque Ta and the road surface gradient θ.

The hybrid vehicle 20 of the embodiment uses the adjustment torque setting map to set the adjustment torque Ta. The adjustment torque setting map represents the variation in adjustment torque Ta against the road surface gradient θ as the required torque for converging the vehicle speed of the vehicle with only a driver riding thereon in the reverse direction (in the slide-down direction) to the preset level of vehicle speed based on the vehicle behavior (for example, the speed and the acceleration). One modified procedure may adopt feedback control to set the adjustment torque Ta for convergence of the vehicle speed to the preset level of vehicle speed.

Figure 4:
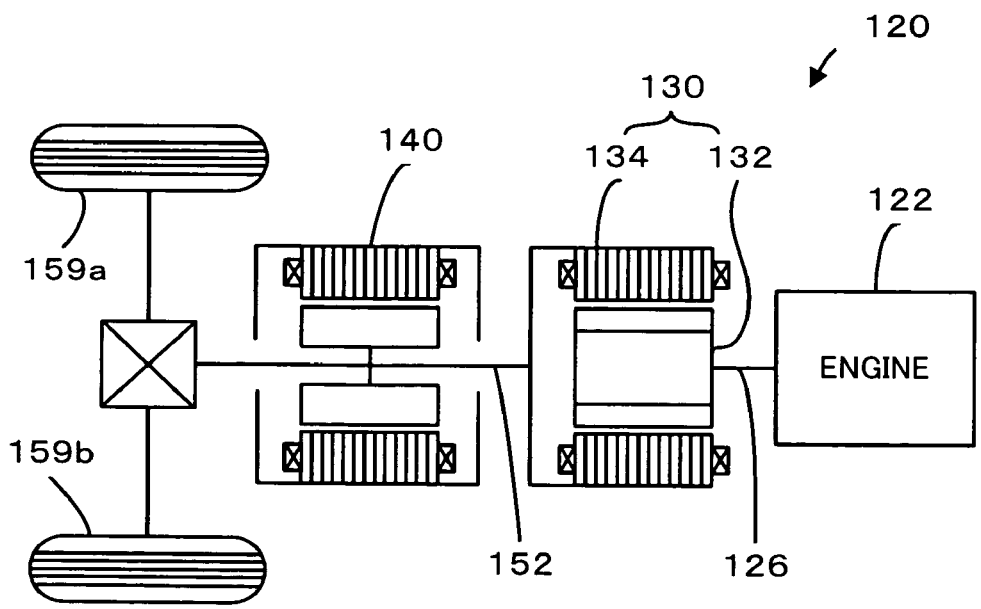
FIG. 4 schematically illustrates the structure of a hybrid vehicle 120 in modified embodiment of the present invention.

The above embodiment regards the hybrid vehicle 20 with the engine 22, the power distribution integration mechanism 30, and the motors MG1 and MG2 mounted thereon. The technique of the invention is applicable to a vehicle of any construction as long as the vehicle is driven with the power given by the setting of the accelerator opening Adrv corresponding to the driver's step-on amount of the accelerator pedal 83. For example, the technique of the invention is applicable to a hybrid vehicle 120 of a modified structure shown in FIG. 4. The hybrid vehicle 120 includes a motor 130, which has an inner rotor 132 connected to a crankshaft 126 of an engine 122 and an outer rotor 134 attached to a drive shaft 152 linked to drive wheels 159a and 159b and is relatively rotated through electromagnetic actions of the inner rotor 132 relative to the outer rotor 134, and another motor 140 that is capable of directly outputting power to the drive shaft 152. The technique of the invention is also applicable to an electric vehicle of a simpler structure having a motor that uses a supply of electric power from a battery to output a driving force.

The above embodiments are to be considered in all aspects as illustrative and not restrictive. There may be many modifications, change, and alterations without departing from the scope or sprit of the main characteristics of the present invention. All changes within the meaning and range of equivalency of the claims are therefore intended to be embraced therein.

The invention claim is:

1. An automobile that is driven with power supplied from a power output device, said power output device having an internal combustion engine and a driveshaft motor that is capable of inputting and outputting power from and to a driveshaft linked to an axle of said automobile, said automobile comprising:
a driving direction setting module that presets a driving direction of said automobile;
a reverse direction travel detection module that detects a travel of said automobile in a reverse direction opposite to the preset driving direction;
a road surface gradient measurement estimation module that either measures or estimates a road surface gradient;
an adjustment torque setting module that sets an adjustment torque at a reverse direction travel direction time when the travel of said automobile in the reverse direction is detected by the reverse direction travel detection module, in an accelerator-off state regardless of a brake on-off position under the condition that the driving direction is preset by the driving direction setting module,
where the adjustment torque set by the adjustment torque setting module causes said automobile with only a driver riding thereon to have a predetermined vehicle speed in the reverse direction and is to be applied to the preset driving direction, when the measured or estimated road surface gradient is not greater than a preset reference gradient, and
the adjustment torque set by the adjustment torque setting module causes said automobile with only the driver riding thereon to have a predetermined vehicle speed in the reverse direction on the preset reference gradient and is to be applied to the preset driving direction, when the measured or estimated road surface gradient is greater than a preset reference gradient;

a vehicle stop-time torque setting module that sets a vehicle stop-time torque equal to 0 as a creep torque at a brake-on vehicle stop time in a brake-on state under the condition that the driving direction is preset by the driving direction setting module;

a driving control module that controls the operation of said power output device to ensure output of the set adjustment torque from the driveshaft motor at the reverse direction travel detection time in the accelerator-off state, controls the operation of said power output device to ensure output of the vehicle stop-time torque from the driveshaft motor at the brake-on vehicle stop time in the accelerator-off state, and controls the operation of said power output device to ensure output of a torque specified by a driver's operation quantity of an accelerator pedal in an accelerator-on state; and a creep torque setting module that sets a creep torque applied in the preset driving direction when a predetermined condition is fulfilled, wherein the adjustment and creep torque settings are compared so that said driving control module actuates and controls said power output device to apply a greater torque between the adjustment torque and the creep torque as a motor torque.

2. An automobile in accordance with claim 1, wherein said driving control module sets the adjustment torque according to a map that represents a variation in adjustment torque against road surface gradient to converge a vehicle speed of said automobile with only a driver riding thereon in the reverse direction to a preset level of vehicle speed.

3. An automobile in accordance with claim 1, said automobile further comprising:

an initial torque setting module that sets an initial torque applied in the preset driving direction, based on the measured or estimated road surface gradient, wherein said driving control module actuates and controls said power output device to apply the initial torque in a brake off state while said automobile is at a stop.

4. An automobile in accordance with claim 1, wherein said reverse direction travel detection module measures a vehicle speed in the reverse direction, and said driving control module sets the adjustment torque to converge the measured vehicle speed in the reverse direction to a preset level of vehicle speed.

5. An automobile in accordance with claim 1, wherein said creep torque setting module sets a value '0' to the creep torque in response to a braking operation of lowering a vehicle speed of said automobile to zero, and sets a predetermined level of the creep torque in response to detection of a brake off state.

6. An automobile in accordance with claim 1, wherein said driving control module releases the adjustment torque in response to an accelerator off operation after an accelerator on operation.

7. An automobile in accordance with claim 1, wherein said power output device comprises a motor that inputs and outputs powers from and to an axle.

8. An automobile in accordance with claim 1, wherein said power output device comprises a power transmission module that transmits power from an output shaft of the internal combustion engine to the driveshaft through input and output of electrical energy-based power and the driving control module controls the internal combustion engine, the driveshaft motor, and the power transmission module to apply a power corresponding to a preset deceleration to the driveshaft.

9. An automobile in accordance with claim 8, wherein said power transmission module comprises: a three shaft-type power input output module that is linked to the output shaft of said internal combustion engine, the drive shaft, and a rotating shaft and inputs and outputs powers from and to one residual shaft according to powers input and output from and to any two shafts among the three shafts; and a rotating shaft motor that inputs and outputs powers from and to the rotating shaft.

10. An automobile in accordance with claim 8, wherein said power transmission module comprises a pair rotor motor that has a first rotor connected to the output shaft of said internal combustion engine and a second rotor connected to the drive shaft to be rotatable relative to the first rotor, where said pair rotor motor enables the input and output of the electrical energy-based powers based on an electromagnetic operation of the first rotor relative to the second rotor.

11. An automobile control method of controlling an automobile that is driven in a preset driving direction with power supplied from a power output device, said power output device having an internal combustion engine and a driveshaft motor that is capable of inputting and outputting power from and to a driveshaft linked to an axle of said automobile, said automobile control method comprising the steps of:

(a) detecting a travel of said automobile in a reverse direction opposite to the preset driving direction, and either measuring or estimating a road surface gradient;

(b) setting an adjustment torque at a reverse direction travel detection time when the travel of said automobile in the reverse direction opposite to the preset driving direction is detected in an accelerator-off state, and controlling operation of said power output device to ensure output of the set adjustment torque from the driveshaft motor, where the adjustment torque is set to make the automobile with only a driver riding thereon have a predetermined vehicle speed in the reverse direction and to be applied to the preset driving direction, when the measured or estimated road surface gradient is not greater than a preset reference gradient, and the adjustment torque is set to make said automobile with only the driver riding thereon have a predetermined vehicle speed in the reverse direction on the preset reference gradient and to be applied to the preset driving direction, when the measured or estimated road surface gradient is greater than the preset reference gradient, setting a vehicle stop-time torque equal to 0 as a creep torque at a brake-on vehicle stop time in the accelerator-off state and controlling the operation of said power output device to ensure output of the vehicle stop-time torque from the driveshaft motor, and controlling the operation of said power output device to ensure output of a torque specified by a driver's operation quantity of an accelerator pedal in an accelerator-on state; and (c) setting a creep torque applied in the preset driving direction when a predetermined condition is fulfilled, prior to said step (b), wherein the adjustment and creep torque settings are compared so that said step (b) actuates and controls said power output device to apply a greater torque between the adjustment torque and the creep torque as a motor torque.

* * * * *